US010670531B2

(12) United States Patent
Gupta et al.

(10) Patent No.: US 10,670,531 B2
(45) Date of Patent: Jun. 2, 2020

(54) INFRARED DETECTION CAMERA

(71) Applicant: Laser & Plasma Technologies, LLC, Hampton, VA (US)

(72) Inventors: Mool C. Gupta, Yorktown, VA (US); Alexander C. Edrington, Norfolk, VA (US); James I. Harp, Williamsburg, VA (US); Waverley D. Marsh, Hampton, VA (US); Guoqing Paul Shen, Blacksburg, VA (US)

(73) Assignee: LASER & PLASMA TECHNOLOGIES, LLC, Hampton, VA (US)

( * ) Notice: Subject to any disclaimer, the term of this patent is extended or adjusted under 35 U.S.C. 154(b) by 0 days.

(21) Appl. No.: 15/398,678

(22) Filed: Jan. 4, 2017

(65) Prior Publication Data

US 2017/0336328 A1    Nov. 23, 2017

Related U.S. Application Data

(60) Provisional application No. 62/274,729, filed on Jan. 4, 2016.

(51) Int. Cl.
 *G01N 21/84* (2006.01)
 *G01N 21/88* (2006.01)
(52) U.S. Cl.
 CPC ..... *G01N 21/8422* (2013.01); *G01N 21/8806* (2013.01); *G01N 2021/8427* (2013.01)
(58) Field of Classification Search
 CPC ....... G01N 2021/8427; G01N 21/8422; G01N 21/8806
 See application file for complete search history.

(56) References Cited

U.S. PATENT DOCUMENTS

| | | | | |
|---|---|---|---|---|
| 6,495,833 B1* | 12/2002 | Alfano | ............... | G01N 21/4795 250/330 |
| 7,012,684 B1* | 3/2006 | Hunter | ............... | G01N 21/8903 250/559.44 |
| 7,145,148 B2* | 12/2006 | Alfano | ............... | G01N 21/3581 250/341.8 |
| 7,164,146 B2* | 1/2007 | Weir | ................. | G01N 21/8422 250/559.27 |
| 7,462,809 B2* | 12/2008 | DiMarzio | .......... | G01N 21/8422 250/208.1 |

(Continued)

*Primary Examiner* — Marcus H Taningco
(74) *Attorney, Agent, or Firm* — Vance Intellectual Property PC

(57) ABSTRACT

An infrared detection camera for the inspection of coated substrates. A corrosion sensing instrument is handheld, portable, battery powered, compact and lightweight. The camera performs nondestructive, real time imaging of corrosion and defects beneath painted metal or plastics or composite surfaces. The device includes a user-friendly computer interface for real time imaging and image storage capability and is typically used for detecting early stage corrosion beneath painted aircraft aluminum surfaces. The handheld device has a front "open air" imaging port which is designed to be placed in soft contact against the painted surface to be inspected by the instrument. The device includes an infrared camera and infrared lighting to capture an image of the surface. The captured image is transferred to a computer and analyzed to locate imperfections below a coating on a surface.

22 Claims, 6 Drawing Sheets

(56) References Cited

U.S. PATENT DOCUMENTS

| | | | |
|---|---|---|---|
| 8,577,120 B1* | 11/2013 | Koshti | G06T 7/0004 |
| | | | 250/341.8 |
| 8,581,602 B2* | 11/2013 | Bray | G01B 15/02 |
| | | | 324/642 |
| 8,766,193 B2* | 7/2014 | Reinke | G01N 21/55 |
| | | | 250/341.1 |
| 2004/0119018 A1* | 6/2004 | Alfano | G01N 21/8806 |
| | | | 250/341.1 |
| 2008/0107309 A1* | 5/2008 | Cerni | G06K 9/00033 |
| | | | 382/115 |
| 2008/0111074 A1* | 5/2008 | Weir | G01N 21/21 |
| | | | 250/338.1 |
| 2009/0030276 A1* | 1/2009 | Saadat | A61B 1/00089 |
| | | | 600/112 |
| 2010/0127173 A1* | 5/2010 | Schmidt | G01M 3/38 |
| | | | 250/338.5 |
| 2011/0032326 A1* | 2/2011 | Hollander | G01J 5/02 |
| | | | 348/36 |
| 2013/0162835 A1* | 6/2013 | Forland | H04N 5/23222 |
| | | | 348/164 |
| 2013/0170024 A1* | 7/2013 | Teplitz | G02B 21/084 |
| | | | 359/387 |
| 2015/0097944 A1* | 4/2015 | Palm | G01N 25/72 |
| | | | 348/129 |
| 2016/0313257 A1* | 10/2016 | Marivoet | G01N 21/8806 |

* cited by examiner

INFRARED DETECTION CAMERA

CROSS REFERENCE TO RELATED APPLICATION

This application claims the benefit of U.S. Provisional Application No. 62/274,729, filed Jan. 4, 2016 for "INFRARED DETECTION CAMERA", incorporated by reference herein in its entirety.

BACKGROUND OF THE INVENTION

1. Field of the Invention

This invention relates generally to an infrared detection camera and more particularly to an infrared imaging system which can detect anomalies beneath a coating.

2. Description of Related Art

This invention has uses in the area of nondestructive evaluation to discover anomalies such as stress fractures, imperfections, or corrosions beneath a coating. Such anomalies occur beneath the coating and are are impossible to detect visually due to the existence of the coating.

Prior art devices generally use broad spectrum light, outside the infrared wavelengths. Such devices can cause heating which affects any image obtained due to the substrate radiating heat. Such devices use sunlight or ambient light which negatively affects the quality of the analysis. Further, such devices are generally held a distance away from the surface being analyzed which allows interference from effects such as stray light, radiation, and thermal radiation. Finally, many of the prior art devices are not safe for the human eye making them dangerous to use.

U.S. Pat. Nos. 8,242,445 and 8,822,922 teach an inspection system which captures an infrared image, sound information, and/or electrical measurement information which may be recorded. This system is complex and requires sensors, microphones, booms and audio processing equipment to function.

U.S. Pat. No. 8,003,941 teaches a thermal imaging system which captures a thermal image and transfers it to a computer for analysis. This system requires a device capable of capturing a thermal image which is based on a dummy image stored in a computer.

U.S. Pat. No. 8,253,105 teaches a system for analyzing thermal images. Again, this system requires a device capable of capturing a thermal image. This system relies on a system of superimposing markers on the captured thermal image in order to perform any analysis of the captured thermal image.

U.S. Pat. No. 8,436,311 teaches a method for predicting a thermal or chemical effect in a painted or coated composite material. This method requires the generation of a calibration model for each material upon which predictions are to be made.

U.S. Pat. Nos. 8,368,034 and 8,502,168 teach a detection system for detecting, inspecting and classifying substances using enhanced photoemission spectroscopy. This system uses a synchronous detector and visible light filter for enhanced detection along with filters, a synchronous detector, databases of chemical substances and operated in the ultraviolet range.

U.S. Pat. No. 8,937,657 teaches a portable inspection system for 3D surface metrology. This device generates patterns and projects them onto the surface to be analyzed. Then the surface is photographed and images are captured.

U.S. Pat. No. 9,001,326 teaches a system which generates a light signal from a light source operating in the light spectrum and modifying the signal by polarizing it and then reflecting the polarized signal onto the target to observe the subsurfaces of a target material.

It is an object of the invention to provide a system for analyzing coated surfaces.

It is further an object to provide a system for analyzing coated surfaces which detects anomalies beneath a coated surface.

It is further an object to provide a system for analyzing coated surfaces which functions in the infrared range.

It is further an object to provide a system for analyzing coated surfaces which reduces or eliminates the effects of ambient light and or radiation on the analysis process.

It is further an object to provide a system for analyzing coated surfaces which is portable, lightweight, energy efficient.

It is further an object to provide a system for analyzing coated surfaces which is a standalone device.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a device for imaging coated surfaces which includes an imaging array, a lens, a window, an infrared illumination assembly, a power source, electronics for providing instructions to the imaging array, for powering the infrared illumination assembly and for capturing images, and a housing having a viewing port. The imaging array is preferably an infrared camera which has a wavelength in the range of 3.4 to 4.8 microns, a resolution of 640 by 480, a frame rate of 120 kHz. The lens is preferably made from an infrared transmitting material, such as germanium and silicon, has an operational wavelength of 3.7 to 4.8 microns, an F number of 3.25 and a 20-degree field of view. The window is placed inside the housing above the viewing port, is preferably made of sapphire and has a thickness of 3 mm. The infrared illumination assembly preferably includes at least one light emitting illumination source and at least one reflector. The light emitting illumination source preferably emits high energy infrared radiation and the reflector is preferably paraboloid. The electronics preferably include a power switch, a fan, a computer, an electronics board, and a video converter board which preferably includes software for image storage and viewing. The housing is preferably constructed from a material such as metal, plastic, composite or a combination of any of these materials and most preferably aluminum.

BRIEF DESCRIPTION OF THE DRAWINGS

A more complete description of the subject matter of the present invention and the advantages thereof, can be achieved by reference to the following detailed description by which reference is made to the accompanying drawings in which.

Figures 1A, 1B:
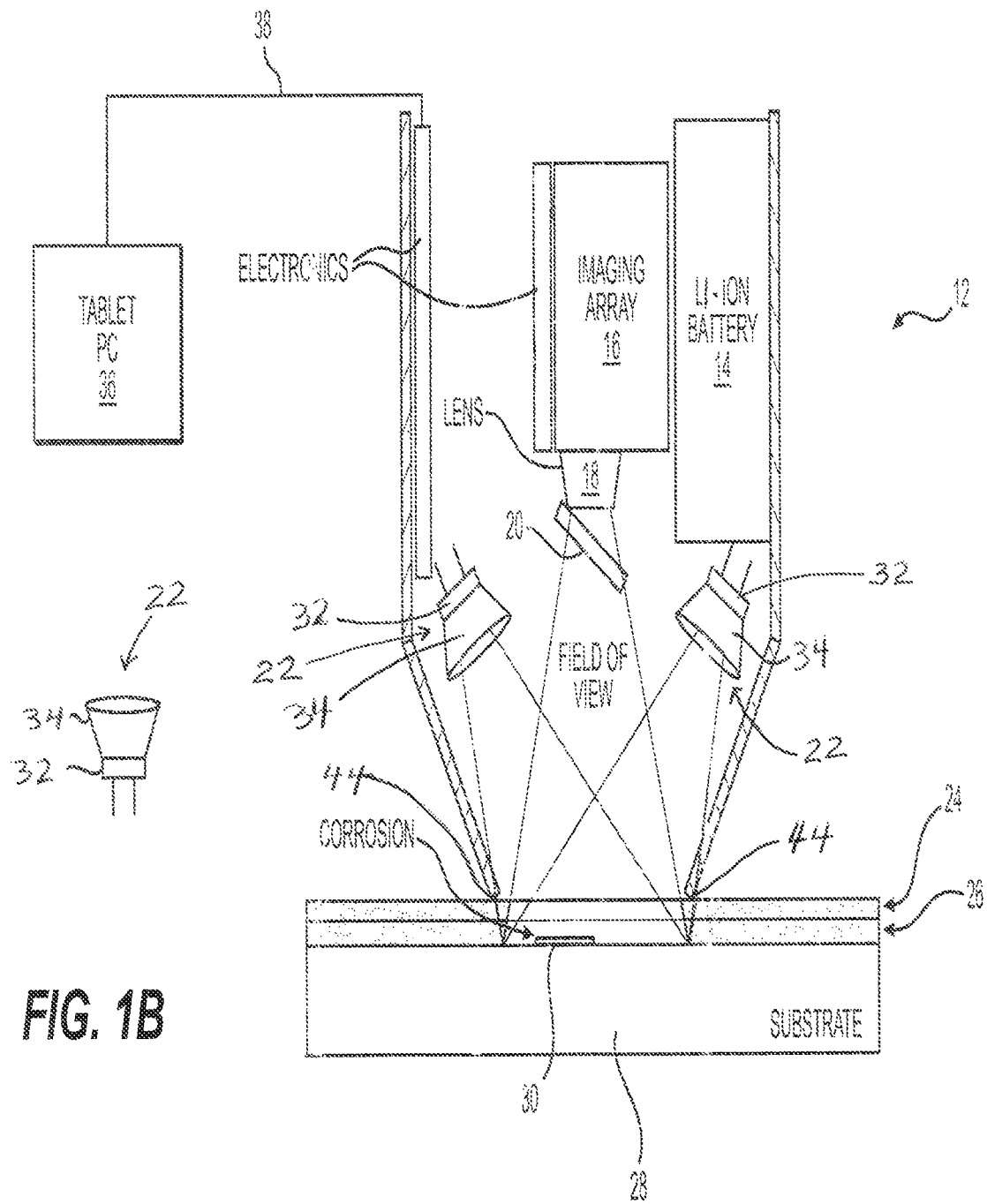
FIG. 1A is a cross-sectional view of the invention in use with a coated substrate with a corrosion anomaly.
FIG. 1B is an enlarged view of the infrared illumination assembly.

ELEMENT LISTING 12 imaging system
14 power supply
16 imaging array
18 lens
20 sapphire window
22 infrared illumination
24 topcoat
26 primer
28 substrate
30 corrosion
32 emitter
34 reflector
36 computer
38 electronics
40 computer
42 housing
44 viewing port

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

The infrared detection camera 12 according to the present invention is a corrosion sensing instrument which is preferably handheld, portable, battery powered, compact and lightweight. The camera performs nondestructive, real time imaging of corrosion and defects beneath painted metal or plastics or composite surfaces. Defects such as stress fractures, imperfections and corrosion can be detected beneath a coating. The device preferably includes user-friendly computer interface for real time imaging and image storage capability and is typically used for detecting early stage corrosion beneath painted aircraft aluminum surfaces. The camera can also be used for nondestructive imaging of defects and various textured features beneath painted surfaces. The preferably handheld device has a front "open air" imaging port which is designed to be placed in soft contact against the painted surface to be inspected by the instrument.

Figure 2:
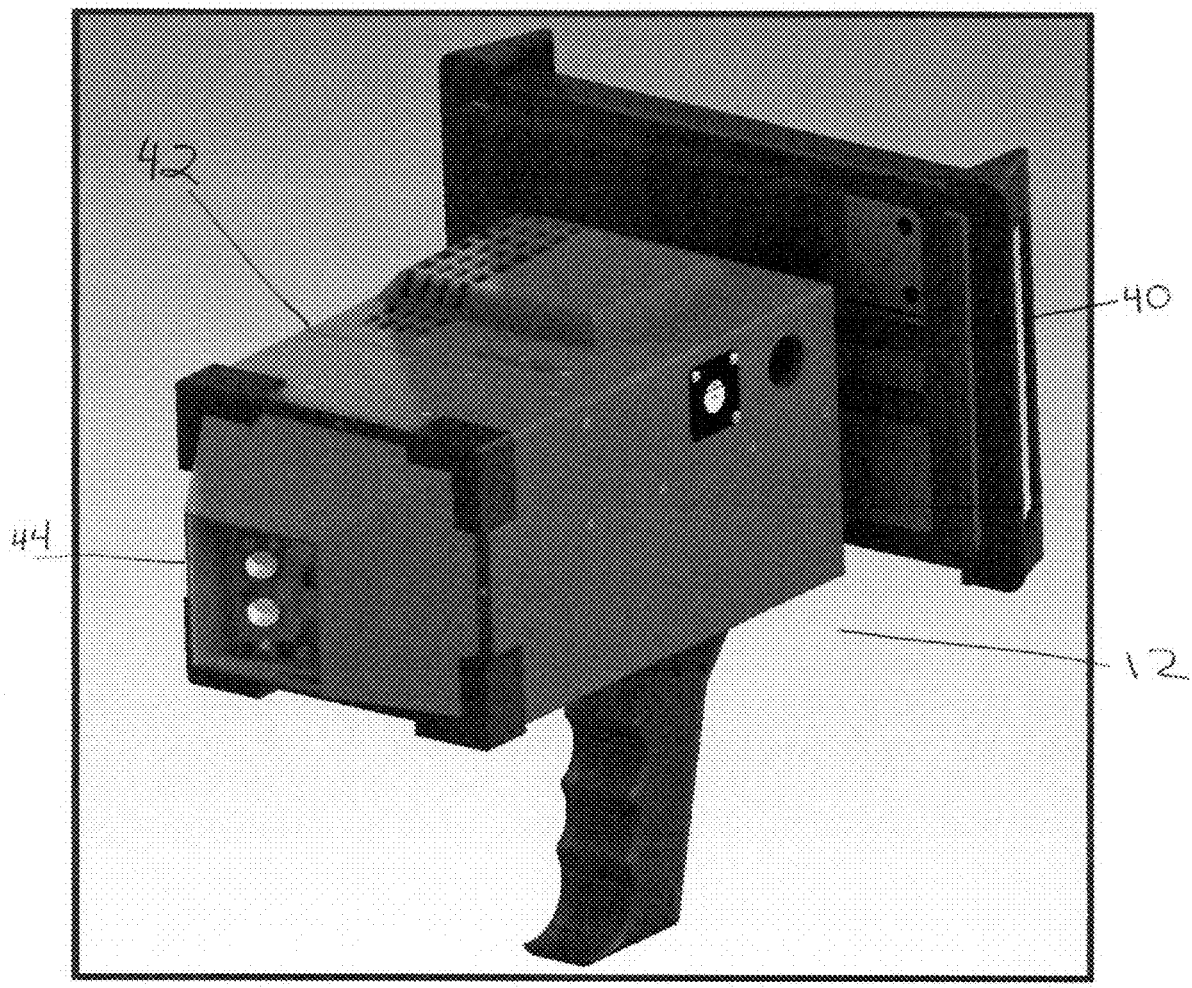
FIG. 2 is a rear perspective view of the preferred embodiment of the invention.

An imaging device 12 according to the present invention is shown in cross-sectional view in FIGS. 1A and 1B and in perspective view in FIG. 2. The device includes an imaging array 16, a lens 18, a sapphire window 20, an infrared illumination assembly 22, a power source 14, electronics for providing instructions to the imaging array and for capturing images, all within a housing.

The imaging array 16 preferably includes an infrared camera with a wavelength of operation in the range of 3.4 to 4.8 microns, resolution of 640×480, a frame rate of up to 120 Hz and dimensions of 60 mm×50 mm×50 mm. The imaging array 16 of the preferred embodiment consists of a mid-wave infrared high performance and compact camera from DRS, the Zafiro Micro 640.

The lens 18 is preferably made of an infrared transmitting material such as silicon (Si) or germanium (Ge), has an operational wavelength of 3.7 to 4.8 microns, an F number of 3.25 and a 20-degree field of view. The lens 18 of the preferred embodiment is a custom mid-wave infrared ("MWIR"), low f-number lens selected for high light gathering power from Novatech.

The device preferably includes a sapphire window 20 for protecting the lens 18. The window 20 is designed for infrared transmission and formed to fit above the viewing port (described below). In the preferred embodiment, the window 20 has a size of 1.5 inches×1.5 inches and a thickness of 3 mm, such as is available from the Mell Griot Corp.

The infrared illumination assembly 22 preferably uses a two-dimensional photonic crystal structure to tune and confine the IR emission in the 3-5 micron spectral range. The source provides high energy infrared radiation with minimal energy consumption. In the preferred embodiment, the infrared assembly includes electrically efficient MWIR light emitting illumination sources 32 from Boston Electronics, the TuneIR35 and modified paraboloid reflectors 34 for MWIR as the illumination source, from Mouser Electronics. In the preferred embodiment eight MWIR light emitting illumination sources 32 are positioned and offset from the viewing port (described below) in order to uniformly illuminate the viewing port at an angle of between 30 and 60 degrees from the normal to the viewing port.

The power source 14 is preferably a lithium ion battery but may be any type of battery used for similar electronic devices, preferably rechargeable. In the preferred embodiment, the battery 14 powers the device 12 for at least two hours of continuous usage. Although reducing the portability of the device, the power source may be external to the housing, in the form of, for example, AC power.

The electronics include a power switch, power for lights and fan. In the preferred embodiment, the electronics include custom Lab View driven software for image storage and viewing on computer, a touch-pad tablet computer, a custom electronics board for electrically powering the device's electronic elements (the camera, electronic boards, lights, fan, etc.), and a video converter board to send images from the MWIR camera to the tablet computer.

The housing is rigid and weather resistant and is preferably metal, plastic or a composite material. In the preferred embodiment, the housing is a custom aluminum housing for ergonomic, efficient and rugged packaging of the device components. Also inside the housing of the preferred embodiment are shock mounts for vibration and shock isolation of the MWIR camera and cooling fan and heat dissipation fins for removing heat generated by MWIR camera. In the forward portion of the preferred embodiment of the invention is an open-air viewing port measuring 2"×2", which can be scaled for different sized devices. The viewing port is imaged by the custom lens and the MWIR camera which is located approximately five inches back from the viewing port. The housing may include a heat sink to dissipate excess heat and cool the device.

In use, continuous real time imaging of the 2"×2" viewing port is at a video rate of about 30 Hz. Each image is captured by touch screen buttons on tablet computer.

Function of the infrared camera detection device.

Figure 3:
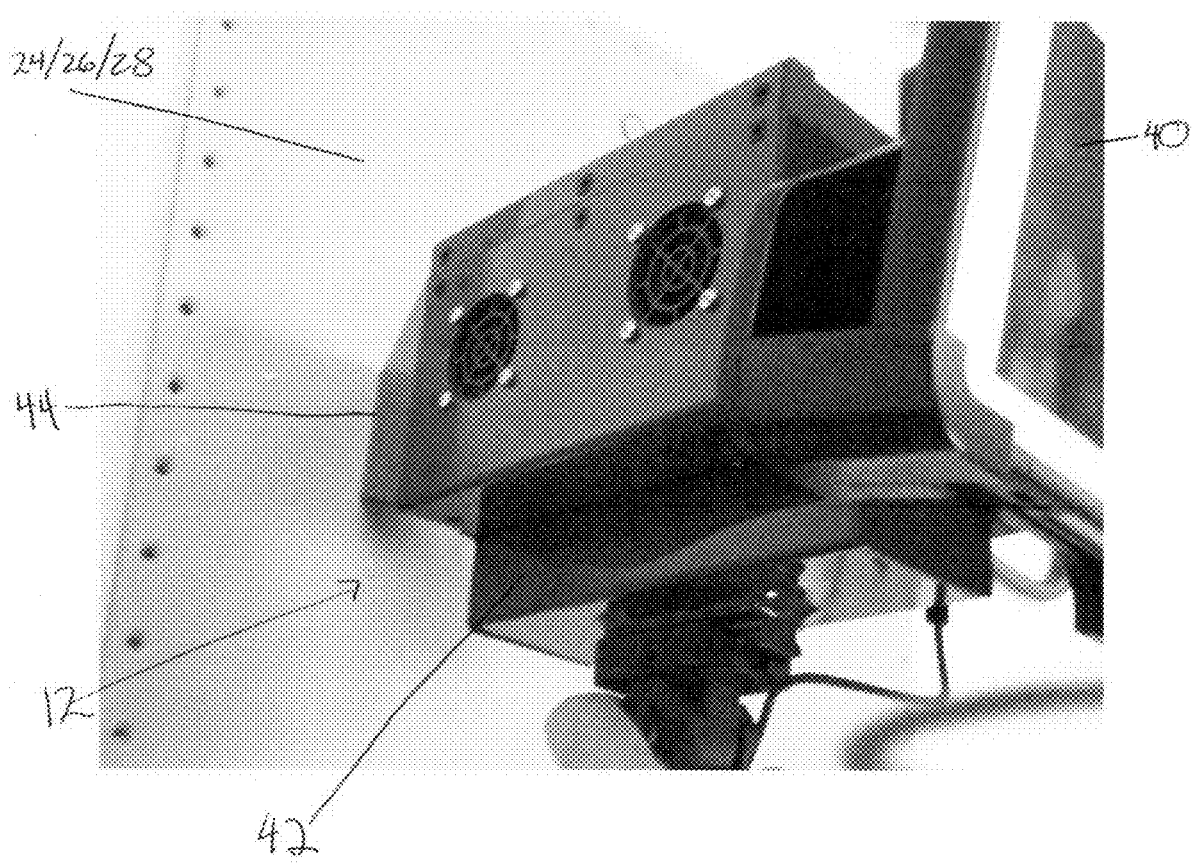
FIG. 3 is a perspective view of the preferred embodiment of the invention in use.
Figures 4, 5:
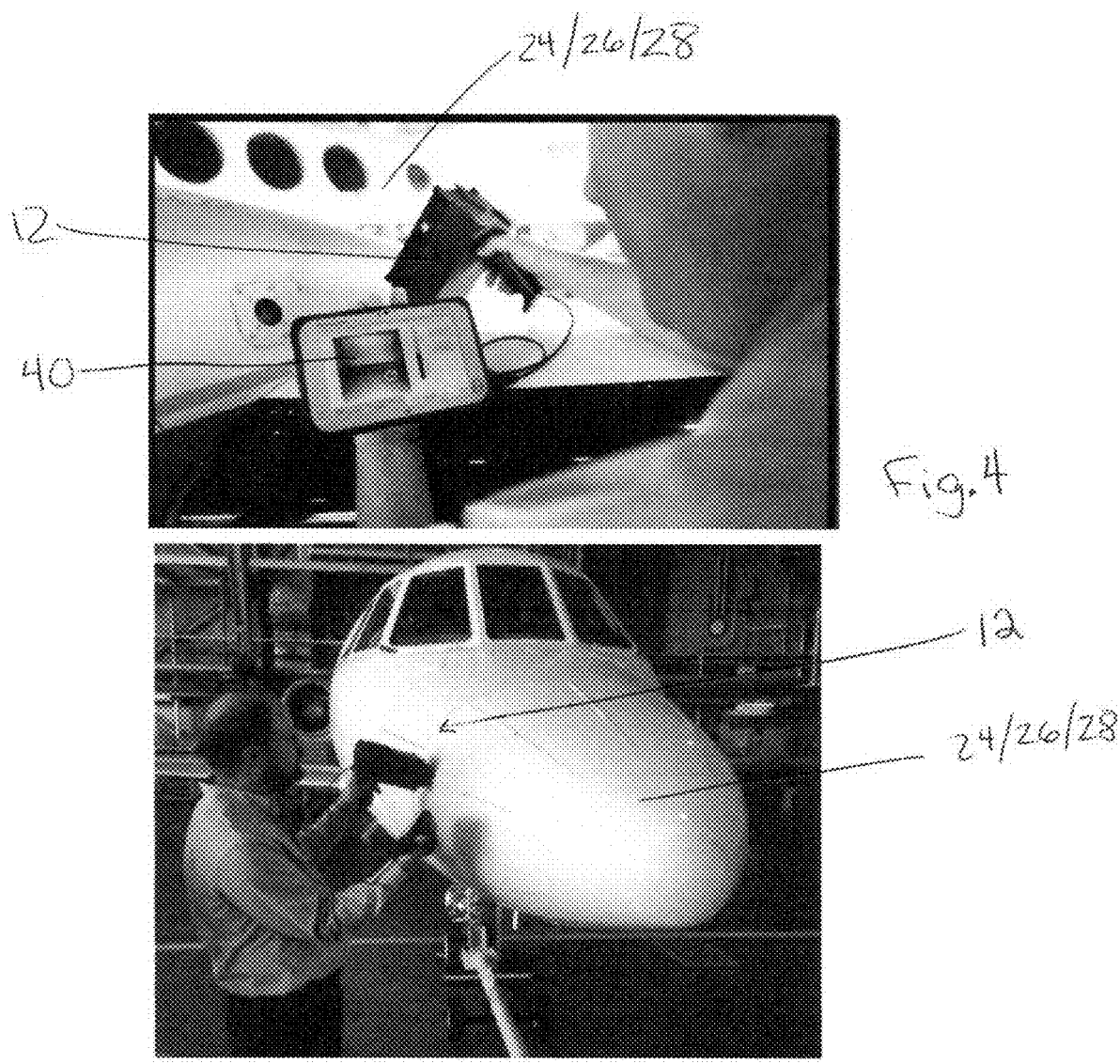
FIG. 4 is a perspective view of the preferred embodiment of the invention in use.
FIG. 5 is a perspective view of the preferred embodiment of the invention in use.
Figure 6:
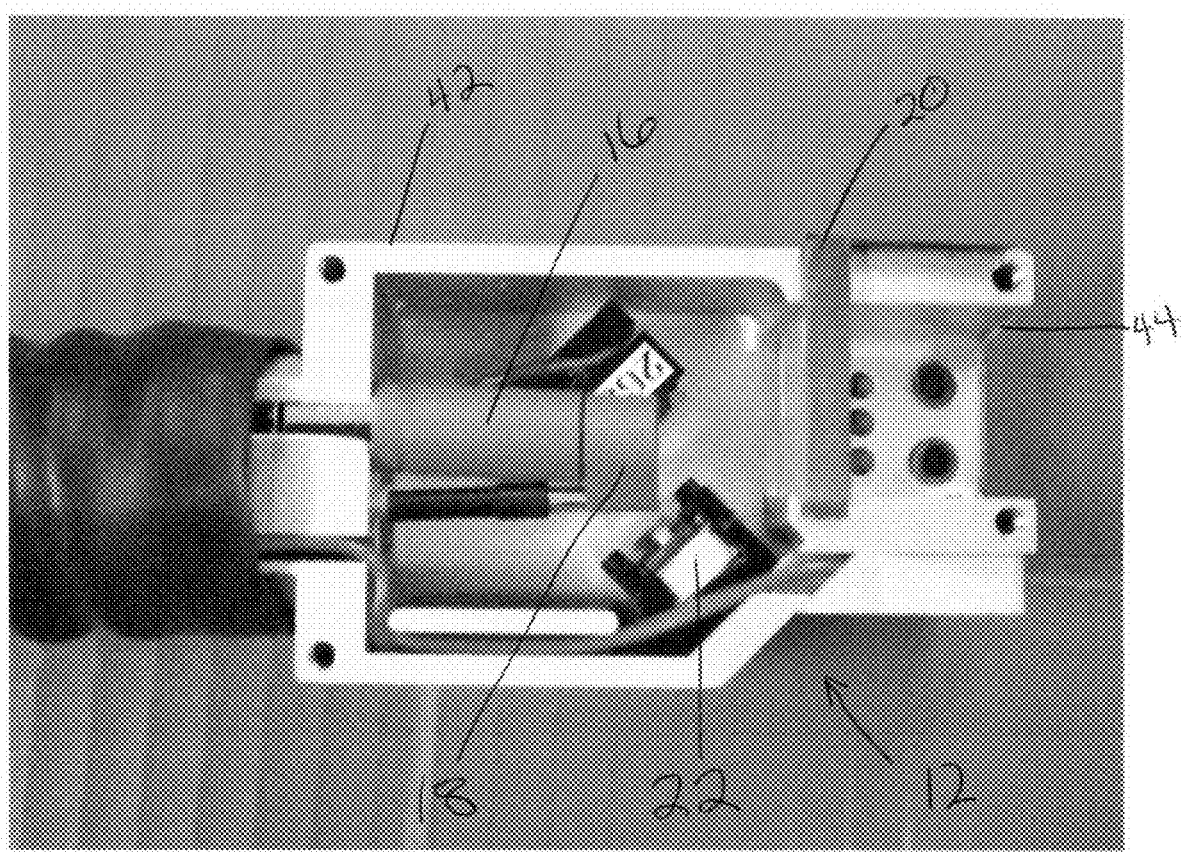
FIG. 6 is a miniaturized version of the invention.
Figure 7:
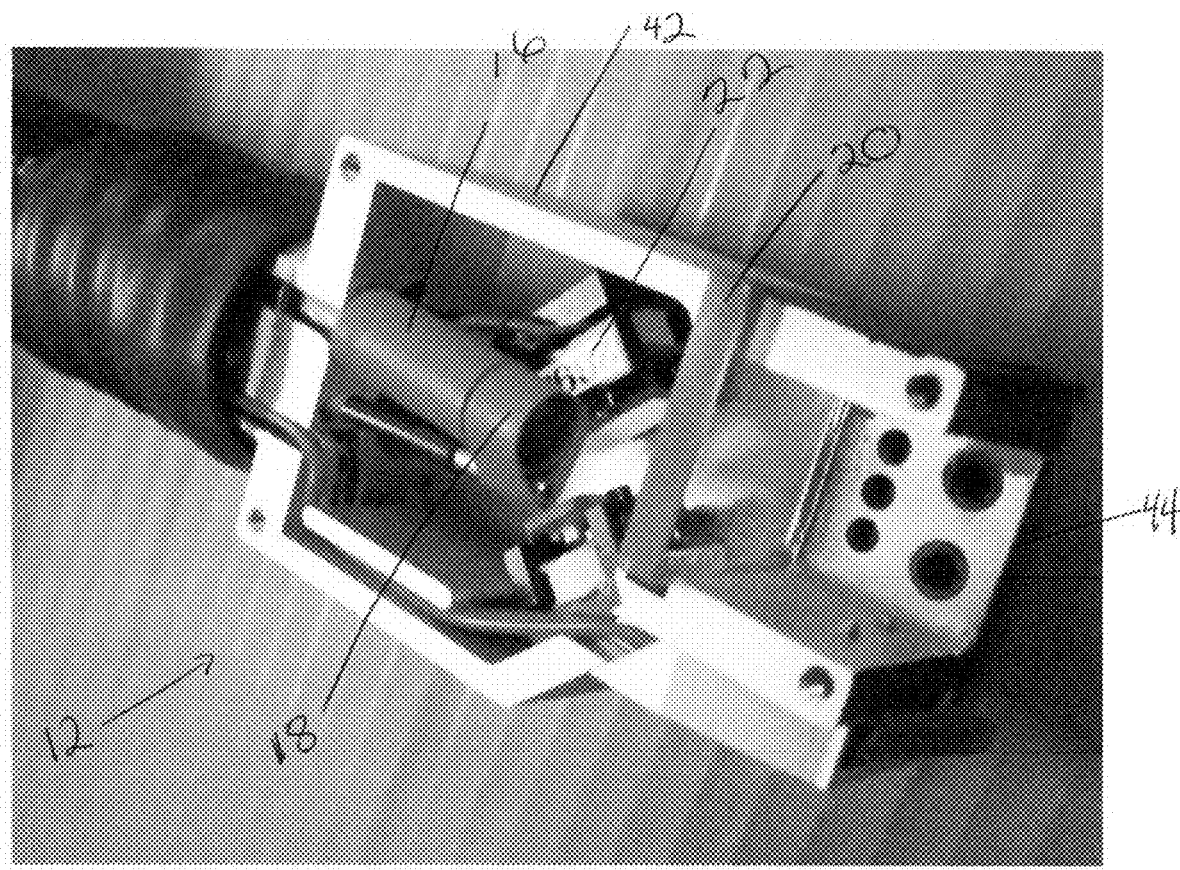
FIG. 7 is a a miniaturized version of the invention.

Aircraft paint, while opaque to visible light, is more transparent to mid wave infrared wavelengths in the 3-5 micron range. Aluminum corrosion and/or defects or other surface texturing beneath a painted surface 24/26/28 usually has different reflectivity scattering than the surrounding painted material. In operation (shown in FIGS. 3, 4 and 5), a portion of the infrared light passes through the coating (topcoat 24 and primer 26) and reflects or scatters off the substrate 28 such that the camera device 12 captures the reflection. With a suitable MWIR camera 16 and lighting source 22, these types of sub-painted features can be imaged and visually presented on a computer screen for the user to see these subsurface features without any damage coming to the painted surface 24/26/28. The infrared camera detection device 12 preferably has a viewing port of two inches by two inches which is preferably placed on the surface 24/26/28 to be inspected. By placing the device directly on or very close to the surface 24/26/28 to be inspected, effects from the external environment (such as radiation or thermal radiation) or ambient light is reduced or eliminated, resulting in improved images. By having the device 12 focus at the viewing port, user error is reduced because the user does not have to approximate how far from the surface 24/26/28 the device 12 must be held, instead, the viewing port of the device 12 is simply placed on the surface 24/26/28 to be inspected. For faster inspection, the viewing port can be made larger, for example, ten inches by ten inches The infrared camera detection device 12 has a suitable MWIR camera 16 and uniform MWIR lighting source that is packaged to facilitate the imaging of the desired subsurface features. In the preferred embodiment, the packaging and viewing area are arranged to provide a rugged, handheld instrument 12 that is portable and is capable of providing real time video and includes a selectable image capturing feature. The infrared camera detection device is designed to operate continuously for about 2 hours on a single charge of the rechargeable batteries.

Other embodiments can be made to increase viewing area, improve image processing and capture, or to extend battery life. The preferred embodiment provides a device 12 with optimal size, weight, efficiency, portability and cost.

By using only light in the infrared wavelengths, heating of the surface 24/26/28 being inspected is prevented, resulting in an improved image and eliminates the possibility of damaging the surface 24/26/28. Additionally, the device 12 is safe to the eye and uses only the power needed for the infrared wavelengths.

The preferred embodiment is described as being used for inspecting painted aircraft surfaces but the device can also be used for the inspection of, military hardware, structural health monitoring, oil & gas pipelines, inspection of chemical storage tanks, inspecting automobiles, ships & submarines, inspecting nuclear pipes & structures and antenna dishes.

Of particular import, the device 12 is designed to be placed directly on or very near to the surface 26/28/30 being inspected. This is a significant improvement over the prior art which requires cameras to be held a set distance away from the surface being inspected. This requires the user to either measure the distance every time or to guess at the distance resulting in poor images. By placing the viewing port 44 directly on the surface 26/28/30 to be inspected, this eliminates guesswork and provides consistently good images. This is accomplished by using infrared light sources 22 which are very efficient for electric to infrared radiation conversion; this results in very low heat generation. This compact device 12 can be placed directly on sensitive surfaces, such as paint, without causing any heat damage. Secondly, the lens 18 is designed so that when the device 12 is placed on the painted surface 26/28/30, the camera 16 is able to capture an image in focus. Thirdly, by placing a soft material, such as rubber, at the outer edge of the viewing port 44, when the device 12 makes contact with paint, it does not affect the surface's structural integrity. Lastly, the entire equipment weighs about 4 pounds, so it is hand held and can easily be placed on the paint's surface. Previously known devices are too large and heavy to be placed directly on the surface and maneuvered around the surface. The preferred embodiment of the invention can be moved over the paint's surface by hand and the camera 16 will continue to capture images in real time. These images are preferably displayed on the computer 36 mounted on the device 12. If desired, the weight of the device 12 can be further reduced by removing the computer 36 from the device 12 and holding it separately, for example on a wrist band. The signal from the corrosion sensor can be sent wirelessly or through a cable.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

What is claimed is:

1. An infrared camera device, said device comprising:
   (a) a handheld housing having an open-air viewing port with an outer edge;
   (b) a soft material fixed to the outer edge of the viewing port:
   (c) a plurality of mid-infrared light sources disposed in said housing, each of said mid-infrared light sources, comprising:
      (i) an emission source, positionally fixed to the housing, for generating a continuous mid-infrared emission from 3-5 microns; and
      (ii) a paraboloid reflector coupled to and partially enclosing said emission source;
         wherein said plurality of mid-infrared light sources are configured to uniformly illuminate said open-air viewing port with mid-infrared light from a corresponding plurality of positions and said mid-infrared light is directed from each of said mid-infrared light sources toward said open-air viewing port along an angle between 30 to 60 degrees measured relative to a normal to said open-air viewing port;
(d) an infrared imager disposed in said housing and focused at said open-air viewing port;
wherein, when said open-air viewing port is placed directly on a coated surface of a substrate, a portion of said mid-infrared light passes through said open-air viewing port and through the coated surface for reflection from the substrate as scattered reflections, and
wherein said infrared imager captures an in-focus infrared image of the scattered reflections at said open-air viewing port;
the infrared imager, further comprises: a mid-infrared camera;
(e) a computer disposed in said housing;
(f) an electronics board disposed in said housing;
(g) a video converter board disposed in said housing; and,
(h) a battery disposed in said housing and capable of powering said camera device;
wherein said camera device is self-contained and portable.

2. A camera device as in claim 1 wherein said infrared imager, further comprises:
a window; and
a lens disposed between said camera and said window, wherein a combination of said camera, said lens, and said window is positioned in said housing so as not to obstruct said mid-infrared light to thereby permit said open-air viewing port to be uniformly illuminated.

3. A camera device as in claim 2 wherein said camera has a wavelength of operation in the range of 3.4 to 4.8 microns.

4. A camera device as in claim 2 wherein said camera has a resolution of 640 by 480.

5. A camera device as in claim 2 wherein said camera has a frame rate of up to 120 Hz.

6. A camera device as in claim 2 wherein said lens is made from an infrared transmitting material.

7. A camera device as in claim 2 wherein said lens is made from an infrared transmitting material selected from the group consisting of germanium and silicon.

8. A camera device as in claim 2 wherein said lens has an operational wavelength of 3.7 to 4.8 microns.

9. A camera device as in claim 2 wherein said lens has an F number of 3.25.

10. A camera device as in claim 2 wherein said lens has a 20 degree field of view.

11. A camera device as in claim 2 wherein said window comprises a sapphire window.

12. A camera device as in claim 2 wherein said window has a thickness of 3 mm.

13. A camera device as in claim 2 wherein said lens is made from an infrared transmitting material selected from the group consisting of germanium and silicon and said window comprises a sapphire window.

14. A camera device as in claim 13 wherein said window has a thickness of 3 mm.

15. A camera device as in claim 1 wherein said electronics include software for image storage and viewing.

16. A camera device as in claim 1 wherein said housing is constructed from a material selected from the group consisting of metal, plastic, composite and a combination of these materials.

17. A camera device as in claim 1 wherein said housing is constructed from aluminum.

18. A camera device as in claim 1 wherein said plurality of mid-infrared light sources comprises eight infrared mid-infrared light sources.

19. A camera device as in claim 1 wherein the mid-infrared camera is a CCD camera.

20. A camera device as in claim 19 wherein the mid-infrared camera, further comprises:
a cooling fan; and,
heat dissipation fins.

21. A camera device as in claim 1 wherein said emission source (i) is light intensity tunable.

22. A camera device as in claim 1 wherein the housing, further comprises:
shock mounts located between the housing and the mid-infrared camera.

* * * * *

UNITED STATES PATENT AND TRADEMARK OFFICE
CERTIFICATE OF CORRECTION

PATENT NO. : 10,670,531 B2
APPLICATION NO. : 15/398678
DATED : June 2, 2020
INVENTOR(S) : Gupta et al.

It is certified that error appears in the above-identified patent and that said Letters Patent is hereby corrected as shown below:

In the Specification

Column 2, Line 41, replace "kHz." with "Hz."

Signed and Sealed this
Fifteenth Day of December, 2020

Andrei Iancu
*Director of the United States Patent and Trademark Office*